United States Patent
Qiu et al.

(10) Patent No.: US 10,656,494 B2
(45) Date of Patent: May 19, 2020

(54) DISPLAY PANEL AND MANUFACTURING METHOD THEREOF, DISPLAY DEVICE, AND METHOD OF CONTROLLING BRIGHTNESS

(71) Applicants: BOE TECHNOLOGY GROUP CO., LTD., Beijing (CN); BEIJING BOE DISPLAY TECHNOLOGY CO., LTD., Beijing (CN)

(72) Inventors: Yun Qiu, Beijing (CN); Zhidong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 148 days.

(21) Appl. No.: 15/744,237

(22) PCT Filed: Jul. 19, 2017

(86) PCT No.: PCT/CN2017/093491
§ 371 (c)(1),
(2) Date: Jan. 12, 2018

(87) PCT Pub. No.: WO2018/059086
PCT Pub. Date: Apr. 5, 2018

(65) Prior Publication Data
US 2019/0004388 A1  Jan. 3, 2019

(30) Foreign Application Priority Data
Sep. 29, 2016 (CN) .......................... 2016 1 0868495

(51) Int. Cl.
*G02F 1/03* (2006.01)
*G02B 26/00* (2006.01)
(Continued)

(52) U.S. Cl.
CPC .......... *G02F 1/167* (2013.01); *G02F 1/13439* (2013.01); *G02F 1/133377* (2013.01);
(Continued)

(58) Field of Classification Search
CPC .... G02F 1/167; G02F 2001/1678; G02F 1/03; G02F 1/133; G02F 1/061; G02B 26/26; G02B 26/00; G02B 26/08
(Continued)

(56) References Cited

U.S. PATENT DOCUMENTS

2004/0027327 A1  2/2004  LeCain et al.
2004/0150325 A1  8/2004  Yamakita et al.
(Continued)

FOREIGN PATENT DOCUMENTS

| CN | 1499460 A | 5/2004 |
|---|---|---|
| CN | 1602510 A | 3/2005 |

(Continued)

OTHER PUBLICATIONS

The Chinese Search Report; Appln. No. 201610868495.9.
(Continued)

*Primary Examiner* — Dawayne Pinkney

(57) ABSTRACT

A display panel and manufacturing method thereof, a display device and a method of controlling brightness are disclosed. The display panel includes a first transparent electrode layer, a second transparent electrode layer, a dielectric layer and a plurality of charged particles. The first transparent electrode layer is disposed at a light-exiting side of the display panel; the second transparent electrode layer is disposed at a light-incident side of the display panel; the dielectric layer is disposed between the first transparent electrode layer and the second transparent electrode layer. A plurality of charged particles are disposed in the dielectric layer; the refractive index of the second transparent elec-
(Continued)

trode layer is larger than the refractive index of the dielectric layer.

18 Claims, 8 Drawing Sheets

(51) Int. Cl.
| | | |
|---|---|---|
| *G09G 3/34* | (2006.01) | |
| *G02F 1/133* | (2006.01) | |
| *G02F 1/167* | (2019.01) | |
| *G02F 1/1343* | (2006.01) | |
| *G02F 1/1335* | (2006.01) | |
| *G02F 1/1333* | (2006.01) | |
| *G02F 1/1677* | (2019.01) | |
| *G02F 1/19* | (2019.01) | |
| *G09F 9/37* | (2006.01) | |
| *G02F 1/1676* | (2019.01) | |

(52) U.S. Cl.
CPC .. *G02F 1/133512* (2013.01); *G02F 1/133514* (2013.01); *G02F 1/134309* (2013.01); *G02F 1/1677* (2019.01); *G02F 1/19* (2013.01); *G09F 9/372* (2013.01); *G02F 1/1676* (2019.01); *G02F 2001/133357* (2013.01); *G02F 2001/134345* (2013.01)

(58) Field of Classification Search
USPC ........ 359/296, 253–254, 245, 290–291, 298; 349/33; 345/49, 105, 107; 430/31, 32
See application file for complete search history.

(56) References Cited

U.S. PATENT DOCUMENTS

| | | | |
|---|---|---|---|
| 2005/0117109 A1 | 6/2005 | Marra et al. | |
| 2005/0168799 A1* | 8/2005 | Whitesides | B82Y 30/00 |
| | | | 359/296 |
| 2006/0087490 A1* | 4/2006 | Ding | G02F 1/133377 |
| | | | 345/107 |
| 2007/0188848 A1* | 8/2007 | Machida | G02F 1/167 |
| | | | 359/296 |
| 2008/0117496 A1* | 5/2008 | Park | G02F 1/133512 |
| | | | 359/296 |
| 2010/0118383 A1* | 5/2010 | Van Abeelen | G02B 5/045 |
| | | | 359/296 |
| 2012/0127561 A1* | 5/2012 | Nishida | G02F 1/167 |
| | | | 359/296 |
| 2013/0128337 A1 | 5/2013 | Takahashi et al. | |
| 2013/0286465 A1* | 10/2013 | Chen | G02F 1/167 |
| | | | 359/296 |
| 2014/0240815 A1 | 8/2014 | Kayashima et al. | |
| 2016/0012762 A1 | 1/2016 | Joo et al. | |
| 2016/0147128 A1* | 5/2016 | Loxley | G02B 5/128 |
| | | | 359/222.1 |
| 2016/0187755 A1* | 6/2016 | Kasegawa | G02F 1/167 |
| | | | 359/296 |

FOREIGN PATENT DOCUMENTS

| | | |
|---|---|---|
| CN | 1678954 A | 10/2005 |
| CN | 101246292 A | 8/2008 |
| CN | 101517466 A | 8/2009 |
| CN | 104020622 A | 9/2014 |
| CN | 105074560 A | 11/2015 |
| CN | 106328016 A | 1/2017 |
| CN | 206075759 U | 4/2017 |
| WO | 2013/112990 A1 | 8/2013 |

OTHER PUBLICATIONS

International Search Report and Written Opinion dated Oct. 11, 2017; PCT/CN2017/093491.
The First Chinese Office Action dated May 4, 2017; Appln. No. 201610868495.9.
The Second Chinese Office Action; dated Sep. 10, 2017; Appln. No. 201610868495.9.

* cited by examiner

DISPLAY PANEL AND MANUFACTURING METHOD THEREOF, DISPLAY DEVICE, AND METHOD OF CONTROLLING BRIGHTNESS

TECHNICAL FIELD

Embodiments of the present disclosure relate to a display panel and a manufacturing method thereof, a display device and a method of controlling brightness.

BACKGROUND

With the developing of display technologies, products with various display functions are applied in daily life, for example, display devices are needed for electronic papers, cell phones, tablet computers, televisions, display screens, laptops, digital photo frames and navigators.

At present, thin film transistor liquid crystal displays (TFT-LCDs) are one type of main-stream display device, however, power consumption of the TFT-LCD is high because polarizers and frequent image refreshing are needed to display images, and thus applicable range of the TFT-LCD is limited, and display technologies based on micro electro mechanical system (MEMS) are emerged. Thin film transistors (TFTs) can be replaced by MEMS switchers in MEMS technologies to reduce the power consumption. MEMS switcher is one kind of extremely tiny concrete switcher, and can control an amount of the light transmitted through each pixel, and thus the power consumption of the MEMS switcher can be reduced to one-sixth of the power consumption of TFT-LCD.

However, display technologies base on MEMS, for example, digital micro mirror device (DMD) technologies and inter-ferometric modulator display (IMOD) technologies, are complicated when fabricating the display devices, and manufacturing processes are complicated too, therefore, detect-free rate of the fabricated display panels is relatively low.

SUMMARY

At least one embodiment of the present disclosure provides a display panel; the display panel comprises a first transparent electrode layer, a second transparent electrode layer, a dielectric layer and a plurality of charged particles. The first transparent electrode layer is disposed at a light-exiting side of the display panel; the second transparent electrode layer is disposed at a light-incident side of the display panel; the dielectric layer is disposed between the first transparent electrode layer and the second transparent electrode layer; and the plurality of charged particles are disposed in the dielectric layer. A refractive index of the second transparent electrode layer is larger than a refractive index of the dielectric layer.

For example, for the display panel provided by the at least one embodiment of the present disclosure, a refractive index of the charged particles is equal to or greater than the refractive index of the second transparent electrode layer.

For example, for the display panel provided by the at least one embodiment of the present disclosure, the charged particles comprise first charged particles, which are configured to scatter light incident on the first charged particles.

For example, for the display panel provided by the at least one embodiment of the present disclosure, the first charged particles are spherical shape particles.

For example, for the display panel provided by the at least one embodiment of the present disclosure, the charged particles further comprise second charged particles and a size of each second charged particle is smaller than a size of each first charged particle.

For example, for the display panel provided by the at least one embodiment of the present disclosure, a ratio of a charge quantity of the second charged particle and a mass of the second charged particle is larger than that of the first charged particle.

For example, for the display panel provided by the at least one embodiment of the present disclosure, the charged particles are transparent particles.

For example, for the display panel provided by the at least one embodiment of the present disclosure, the first transparent electrode layer comprises first electrodes, which are arranged in an array and electrically insulated from each other, and/or the second transparent electrode layer comprises second electrodes, which are arranged in an array and electrically insulated from each other.

For example, for the display panel provided by the at least one embodiment of the present disclosure, the display panel further comprises a barrier. The barrier is disposed between two adjacent first electrodes and/or disposed between two adjacent second electrodes; and enclosed cavities are formed by the barrier, the first transparent electrode layer and the second transparent electrode layer and are arranged in an array.

For example, for the display panel provided by the at least one embodiment of the present disclosure, the barrier is of light-blocking.

For example, for the display panel provided by the at least one embodiment of the present disclosure, the display panel comprises display pixels arranged in array, each display pixel comprises at least two display sub-pixels, each display sub-pixel corresponds to one of enclosed cavities, colors of the charged particles in the at least two display sub-pixels are different from each other.

For example, for the display panel provided by the at least one embodiment of the present disclosure, the display panel further comprises a color resist layer. The color resist layer is disposed at a side of the first transparent electrode layer distal to the second transparent electrode layer, and comprises a color filter of at least one color.

For example, for the display panel provided by the at least one embodiment of the present disclosure, the display panel further comprises a planarization layer, the planarization layer is disposed between the color resist layer and the first transparent electrode layer.

At least one embodiment of the present disclosure further provides a display device including the above-mentioned display panels.

For example, for the display device provided by the at least one embodiment of the present disclosure, the display device further comprises a light source. The light source is configured to allow light incident on the light-incident side of the display panel to satisfy total reflection condition of an incident interface; and the incident interface is an interface between the second transparent electrode layer and the dielectric layer.

For example, for the display device provided by the at least one embodiment of the present disclosure, the display device further comprises a light guide plate. The light guide plate is provided at the light-incident side of the display panel, and is configured to guide light emitted by the light source into the display panel.

For example, for the display device provided by the at least one embodiment of the present disclosure, the light source is a collimation light source; and an incident angle of the collimation light source at the incident interface is larger than a critical angle of total reflection of the incident interface.

At least one embodiment of the present disclosure further provides a method of controlling brightness, which comprises: applying a first voltage, such that charged particles are distributed at a side of a second medium proximal to a first medium, and at least part of an incident light enters into the second medium from the first medium by scattering of the charged particles and exits through the second medium; and applying a second voltage, such that the charged particles are distributed at a side of the second medium distal to the first medium, and the incident light is totally reflected back into the first medium at an interface between the first medium and the second medium, the incident light is incapable of exiting through the second medium. The incident light propagates from the first medium to the second medium.

At least one embodiment of the present disclosure further provides a method for manufacturing a display panel, which comprises: forming a first transparent electrode layer as a light-exiting side of the display panel; forming a second transparent electrode layer as a light-incident side of the display panel; and filling a gap between the first transparent electrode layer and the second transparent electrode layer with a dielectric layer. A plurality of charged particles are disposed in the dielectric layer; and a refractive index of the second transparent electrode layer is larger than a refractive index of the dielectric layer.

For example, for the manufacturing method for the display panel provided by the at least one embodiment of the present disclosure, a refractive index of the charged particles is equal to or greater than the refractive index of the second transparent electrode layer.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
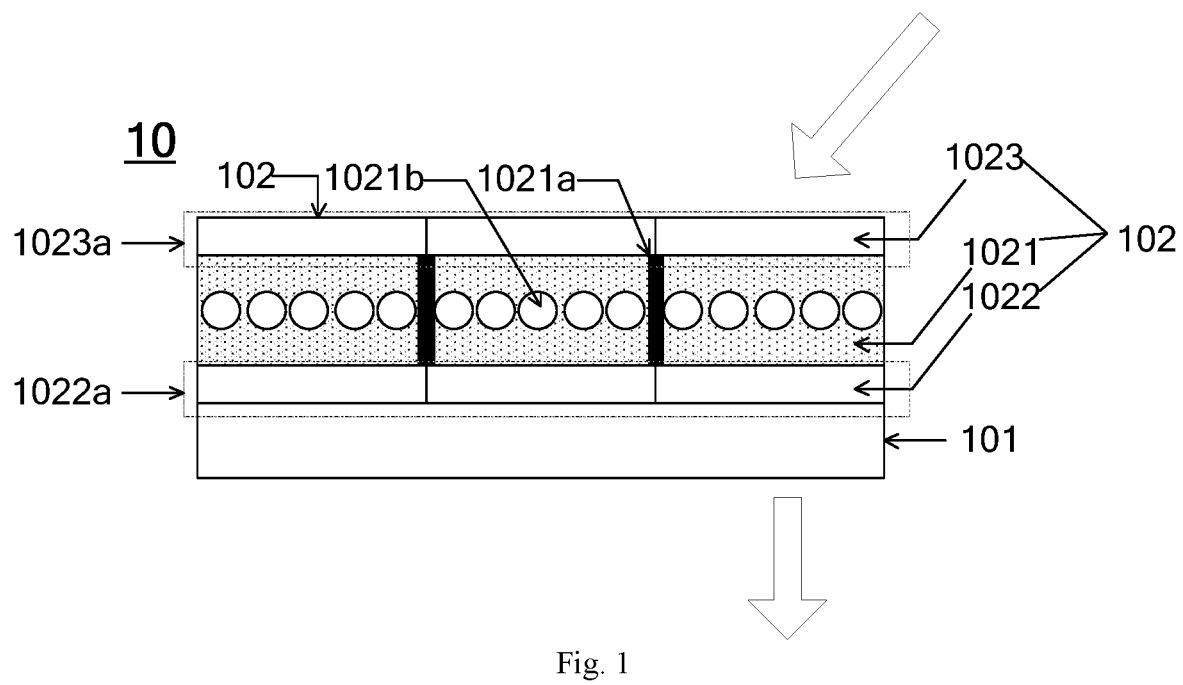
FIG. 1 is a schematically structural view of a display panel provided by a first embodiment.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide a display panel and a manufacturing method thereof, a display device and a method of controlling brightness. The display panel and the manufacturing method thereof, the display device and the method of controlling brightness can allow brightness to be controlled.

At least one embodiment of the present disclosure provides a display panel; the display panel comprises a first transparent electrode layer, a second transparent electrode layer, a dielectric layer and a plurality of charged particles. The first transparent electrode layer is disposed at a light-exiting side of the display panel; the second transparent electrode layer is disposed at a light-incident side of the display panel; the dielectric layer is disposed between the first transparent electrode layer and the second transparent electrode layer; the plurality of charged particles are disposed in the dielectric layer; refractive index of the second transparent electrode layer is larger than refractive index of the dielectric layer.

At least one embodiment of the present disclosure further provides a display device; the display device comprises the above-mentioned display panels.

At least one embodiment of the present disclosure further provides a method of controlling brightness, which comprises: applying a first voltage to distribute charged particles in a second medium at a side closer to a first medium, such that at least part of an incident light enters into the second medium from the first medium through scattering of the charged particles and exit through the second medium; and applying a second voltage to distribute the charged particles in the second medium at a side distal to the first medium, such that an incident light is total reflected at an interface between the first medium and the second medium, and propagates back into the first medium, and the incident light is incapable of exiting through the second medium. The incident light transmits toward the second medium from the first medium.

At least one embodiment of the present disclosure further provides a manufacturing method for a display panel. The manufacturing method for the display panel comprises: forming a first transparent electrode layer at a light-exiting side of the display panel; forming a second transparent electrode layer at a light-incident side of the display panel; and filling a dielectric layer between the first transparent electrode layer and the second transparent electrode layer. A plurality of charged particles are disposed in the dielectric layer; and refractive index of the second transparent electrode layer is larger than refractive index of the dielectric layer.

Description will be given below to the display panel and the manufacturing method thereof, the display device and the light brightness method according to the embodiment of the present disclosure with reference to a plurality of embodiments.

First Embodiment

Figure 2:
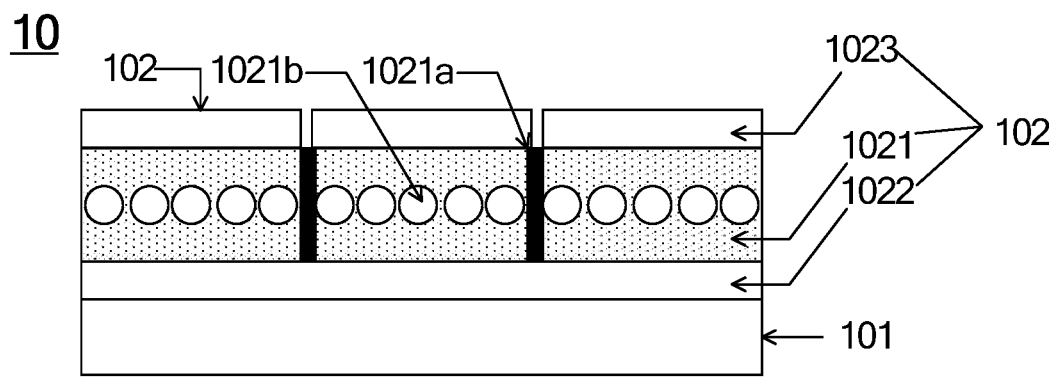
FIG. 2 is another schematically structural view of a display panel provided by a first embodiment.

An embodiment of the present disclosure provides a display panel 10. For example, as illustrated in FIG. 1 and FIG. 2, the display panel 10 comprises a first transparent electrode layer 1022a, a second transparent electrode layer 1023a, a dielectric layer 1021 and a plurality of charged particles (for example, first charged particles 1021b). For example, the first transparent electrode layer 1022a is disposed at a light-exiting side of the display panel 10; the second transparent electrode layer 1023a is disposed at a light-incident side of the display panel 10; the dielectric layer 1021 is disposed between the first transparent electrode layer 1022a and the second transparent electrode layer 1023a. A plurality of charged particles are disposed in the dielectric layer 1021; refractive index of the second transparent electrode layer 1023a is larger than refractive index of the dielectric layer 1021. For example, according to practical demands, the display panel 10 may further comprise a base substrate 101.

For example, concrete structures of the first transparent electrode layer 1022a and the second transparent electrode layer 1023a can be determined according to practical demands, no specific limitation will be given here in the embodiment of the present disclosure. For example, the structures of the first transparent electrode layer 1022a and the second transparent electrode layer 1023a provided by the embodiment of the present disclosure will be described illustratively with reference to FIGS. 2, 3A and 3B.

Figure 3A:
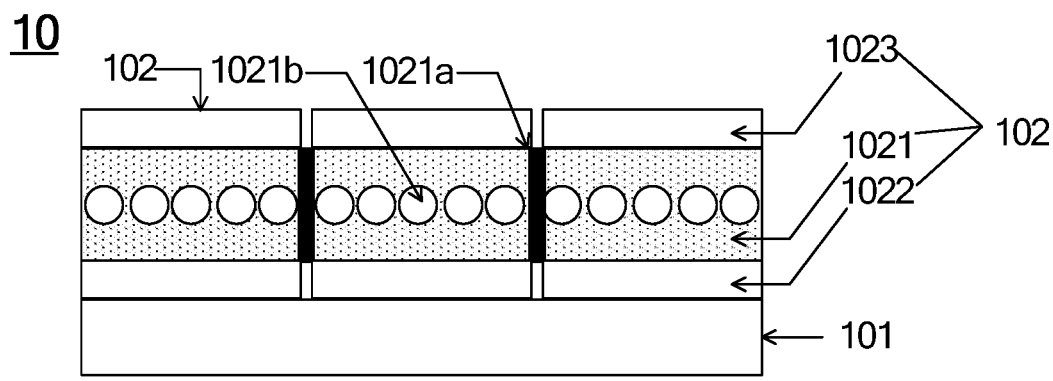
FIG. 3A is further another schematically structural view of a display panel provided by a first embodiment.

For example, as illustrated in FIG. 2, the second transparent electrode layer 1023a comprises second electrodes 1023 arranged in array, that is, the second electrodes 1023 are arranged with an interval between each other. For example, two adjacent second electrodes 1023 are electrically insulated from each other; for example, the first transparent electrode layer 1022a is a plate-shaped electrode, but the embodiments of the present disclosure are not limited to the case. For example, the first transparent electrode layer 1022a comprises first electrodes 1022 arranged with an interval between each other, two first electrodes 1022 are electrically connected to each other through a wire. For another example, the first transparent electrode layer 1022a comprises first electrodes 1022 arranged in array, and two adjacent first electrodes 1022 are electrically insulated from each other; the second transparent electrode layer 1023a is for example a plate-shaped electrode. For further another example, as illustrated in FIG. 3A, the first transparent electrode layer 1022a comprises first electrodes 1022, which are arranged in array and electrically insulated from each other, and the second transparent electrode layer 1023a comprises second electrodes 1023, which are arranged in array and electrically insulated from each other; the first electrodes 1022 and the second electrodes 1023 for example completely overlap with each other in a direction perpendicular to the base substrate 101.

Figure 3B:
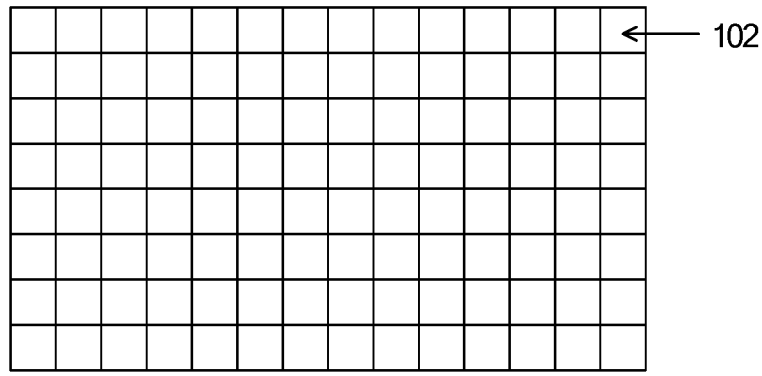
FIG. 3B is a schematically structural view of an arrangement of display sub-pixels provided by a first embodiment.

For example, the interval between two adjacent first electrodes 1022 and the interval between two adjacent second electrodes 1023 can be determined according to practical demands, no specific limitation will be given here in the embodiment of the present disclosure. For example, in order to improve the display effect (for example, an aperture ratio of a display pixel) of the display panel, the interval between two adjacent first electrodes 1022 and/or the interval between two adjacent second electrodes 1023 is minimized as long as an insulation between two adjacent first electrodes 1022 and/or an insulation between the interval between two adjacent second electrodes 1023 can be guaranteed. For example, as illustrated in FIG. 3B, the first electrodes 1022 being arranged in array and electrically insulated from each other and/or the second electrodes 1023 being arranged in array and electrically insulated from each other allows the display panel to include display sub-pixels 102 arranged in array.

For example, the second electrodes 1023 of the second transparent electrode layer 1023a are made from same one material. For example, the second electrodes 1023 of the second transparent electrode layer 1023a are made from metallic oxide such as indium tin oxide (ITO) or indium zinc oxide (IZO), but the embodiments of the present disclosure are not limited to the case. Refractive index of ITO is for example larger than 1.7.

For example, the dielectric layer 1021 can be set according to practical demands; no specific limitation will be given here in the embodiment of the present disclosure. For example, the dielectric layer 1021 is air or transparent ink (for example, electrophoretic medium); for example, refractive index of air is approximately 1; for example, refractive index of the transparent ink is approximately 1.3. For example, the transparent ink is fluorinated hydrocarbon. Therefore, the refractive index of the second electrodes 1023 is larger than the refractive index of the dielectric layer 1021. For example, the charged particles are uniformly disposed in the dielectric layer 1021.

For example, the charged particles comprises a first charged particle 1021b, the first charged particle 1021b is capable of scattering light incident on the first charged particle 1021b. For example, light scattering of the first charged particle 1021b comprises Rayleigh scattering and Mie scattering. For example, in a case that a size of a particle is smaller than 1/10 of the wavelength of the incident light, light scattering of the particle is dominated by Rayleigh scattering; a scattering direction of Rayleigh scattering is random, that is, scattering light propagates toward various directions. For another example, in a case that a size of a particle is larger than the wavelength of the incident light, light scattering of the particle is dominated by Mie scattering, scattering light of Mie scattering tends to propagate toward forward direction (that is, a propagation direction of the scattering light is same as an original propagation direction of the incident light); in addition, the ratio of scattering light propagating toward the forward direction is increased with an increase in the size of the particle.

For example, the structure, material and manufacturing method of the first charged particle 1021b is set according to practical demands; no specific limitation will be given here in the embodiment of the present disclosure. For example, the first charged particle 1021b is a spherical shape particle or an ellipsoid shape particle, but the embodiments of the present disclosure are not limited to the case.

For example, the size of the first charged particle 1021b is in a range of 40 nm to 4 μm; the size of the first charged particle 1021b is, for example, 60 nm, 80 nm, 100 nm, 300 nm, 500 nm, 800 nm, 1 mm or 2 mm. It should be understood that, in the embodiment of the present disclosure, the size of the charged particles can be defined in the following ways, but the embodiments of the present disclosure are not limited to the case. For example, in a case that the charged particles is a spherical shape particle, the size of the charged particles refers to radius of the spherical shape particle; For another example, in a case that the charged particles is a non-spherical shape particle, the size of the charged particles refers to a minimum radius of a spherical shape particle capable of enclosing the non-spherical shape particle.

For example, the charged particles are transparent particles, but the embodiments of the present disclosure are not limited to the case. For another example, the charged particles are capable of absorbing specific color of light, the charged particles for example are red charged particles (absorbing green light and blue light and scattering red light), green charged particles (absorbing red light and blue light and scattering green light) or blue charged particles (absorbing green light and red light and scattering blue light). For example, Boron oxide ($B_2O_3$) with refractive index of approximately 1.9 is adopted to fabricate the charged particles, but the embodiments of the present disclosure are not limited to the case. For example, charge control agent is added to the particles to allow surfaces of the particles to be charged, but the embodiments of the present disclosure are not limited to the case.

For example, refractive index of the charged particles (for example, the first charged particle 1021b) is equal to or similar to the refractive index of the second electrodes 1023. The refractive index of the charged particles is, for example, equal to or greater than the refractive index of the second transparent electrode layer 1023a. For example, the embodiment of the present disclosure takes a case that the refractive index of the charged particles is larger than the refractive index of the second transparent electrode layer 1023a to illustrate technical solutions provided by the present disclosure, but the embodiments of the present disclosure are not limited to the case.

For example, the embodiment of the present disclosure changes positions of the plurality of charged particles disposed in the dielectric layer 1021 of the display sub-pixel 102 by changing voltages applied on the display sub-pixel 102 (for example, voltages applied on the first electrodes 1022 and/or the second electrodes 1023), such that brightness control of the display sub-pixel 102 can be realized. For example, the brightness control of the display sub-pixel 102 (that is, reflectivity control of the display sub-pixel 102) of the display panel 10 will be described in detail with reference to FIG. 4A and FIG. 4B. For example, the light incident on the display sub-pixel 102 at a side where the second electrodes 1023 locate. For example, the incident light satisfies total reflection condition of an incident interface, and the incident interface is an interface between the second transparent electrode layer 1023a and the dielectric layer 1021.

Figure 4A:
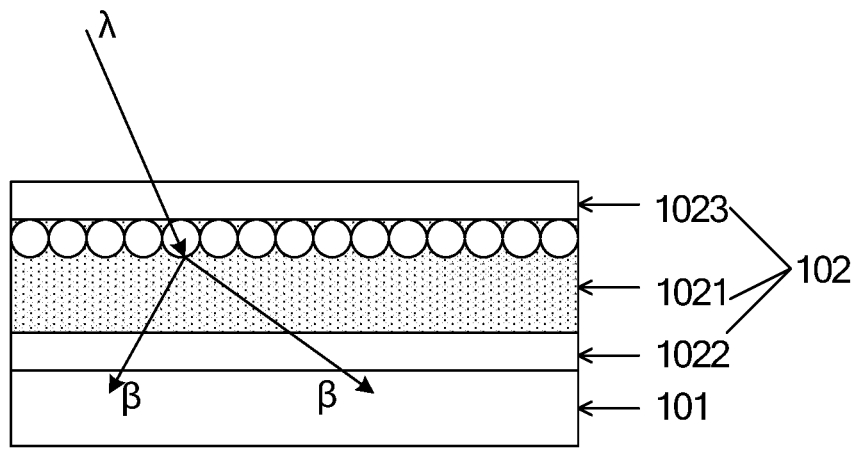
FIG. 4A is an illustrative schematic diagram to illustrate working principle of a display panel, in bright state, provided by a first embodiment.

For example, as illustrated in FIG. 4A, in a case that a first voltage is applied to the display sub-pixel 102, a plurality of charged particles 1021b move to an inner surface of the second electrodes 1023 (that is, a surface of the second electrodes 1023 facing the first electrodes 1022), so as to allow at least part of the incident light λ to be transmitted through the display sub-pixel 102; in such a case, a display state of the display sub-pixel 102 is a bright state. Firstly, because the refractive index of the charged particles is, for example, equal to or greater than the refractive index of the second transparent electrode layer 1023a, the incident light λ can incident on the charged particles via the interface between the second transparent electrode layer 1023a and the charged particles; and then the charged particles (for example, the first charged particles 1021b) can scatter light incident on the charged particles, such that scattering light β is formed. A portion of scattering light β, which does not satisfy total reflection condition of an interface between the charged particles and the dielectric layer 1021, incidents on the dielectric layer 1021, and exits through the first electrodes 1022 of the display sub-pixel 102. Another portion of scattering light β, which satisfies the total reflection condition of the interface between the charged particles and the dielectric layer 1021, is back to the charged particles and then re-scattered by the charged particles, such that a propagation direction of the another portion of scattering light β is changed by the re-scattering of the charged particles. Moreover, the re-scattering of the charged particles can ultimately make the another portion of scattering light β to be not satisfied with the total reflection condition of the interface between the charged particles and the dielectric layer 1021, as a result, the another portion of scattering light β exits through the first electrodes 1022 of the display sub-pixel 102; in such a case, the display state of the display sub-pixel is the bright state.

Figure 4B:
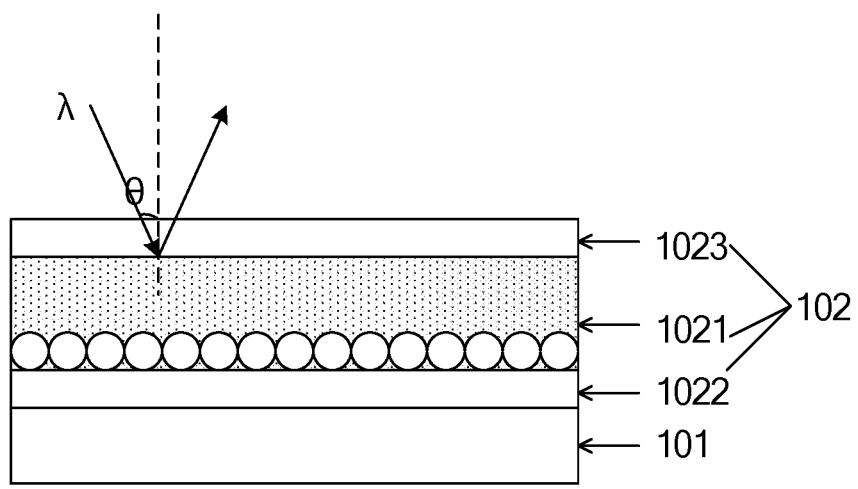
FIG. 4B is an illustrative schematic diagram to illustrate working principle of a display panel, in dark state, provided by a first embodiment.

For example, as illustrated in FIG. 4B, in a case that a second voltage is applied to the display sub-pixel 102, the plurality of charged particles (for example, the first charged particles 1021b) move to an inner surface of the first electrodes 1022; because the refractive index of the second electrodes 1023 is larger than the refractive index of the dielectric layer 1021, the incident light λ enters into an optically thinner medium (a dielectric layer) from an optically denser medium (a second electrode); in a case that an incident angle θ of the incident light λ is equal to or larger than a critical angle (that is, sin θ≥a ratio of the refractive index of the dielectric layer and the refractive index of the second electrode), the incident light λ is totally reflected by the second electrodes 1023; therefore, the light incident on the second electrodes 1023 cannot exit through the first electrodes 1022 of the display sub-pixel 102 (that is, the light cannot be received by human eyes located at the light-exiting side of the display sub-pixel 102); in such a case, the display state of the display sub-pixel is a dark state. For example, the second electrodes 1023 can totally reflect the incident light λ, such that the display brightness in the dark state can be relatively lower, therefore, contrast ratio of the display panel 10 provided by the embodiment of the present disclosure can be increased.

For example, illustrative descriptions will be given to the charged types of the charged particles and the method of applying voltages. For example, the charged particles may be positively charged or negatively charged. For example, in a case that the charged particles are positively charged, the first voltage refers to positive voltage applied on the first electrodes 1022 (that is, to apply positive voltage onto the first electrodes 1022), the second voltage refers to negative voltage applied on the first electrodes 1022; for example, in a case that voltage is applied on the first electrodes 1022, the second electrodes is grounded. For another example, in a case that the charged particles are negatively charged, the first voltage refers to negative voltage applied on the first electrodes 1022; the second voltage refers to positive voltage applied on the first electrodes 1022. For another example, the first voltage and the second voltage also may be applied onto the second electrodes 1023. Alternatively, the first voltage and the second voltage are respectively applied on the first electrodes 1022 and the second electrodes 102. Concrete methods may refer to methods of applying the first voltage and the second voltage onto the first electrodes 1022, no further descriptions will be given herein.

For example, in a case of applying voltages onto the first electrodes 1022 and/or the second electrodes 1023, voltages may be controlled by active driving method. For example, the first electrodes 1022 and/or the second electrodes 1023 are electrically connected with thin film transistor (TFT) switches and the voltage applied on the first electrodes 1022 and/or the second electrodes 1023 may be controlled by the TFT. switches.

Figure 4C:
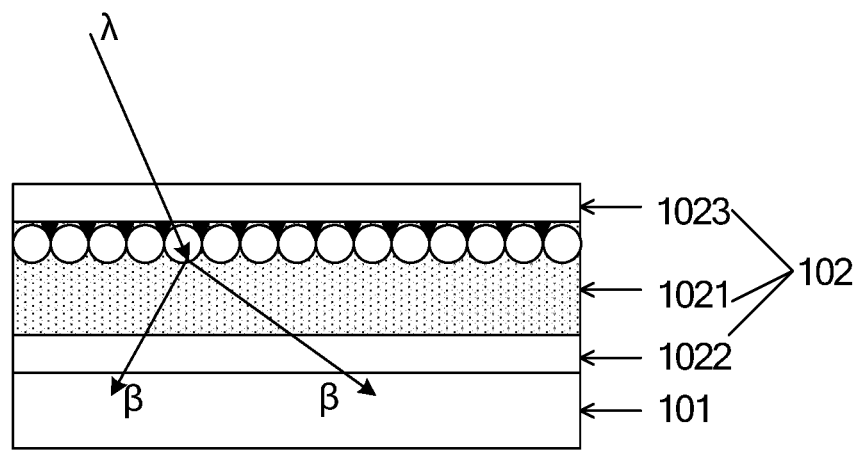
FIG. 4C is a schematically structural view of another display panel provided by a first embodiment.
Figure 4D:
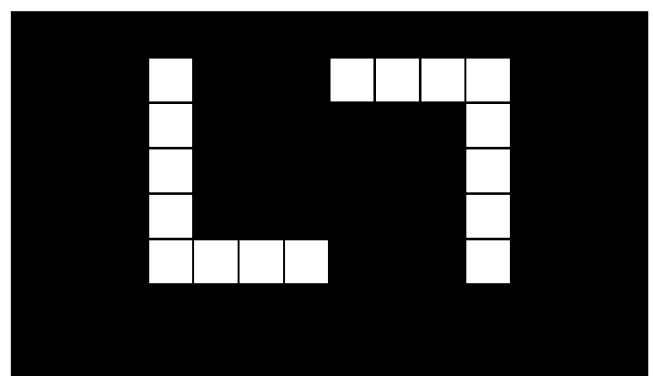
FIG. 4D is a schematic diagram of a displayed pattern of a display panel provided by a first embodiment.
Figure 4E:
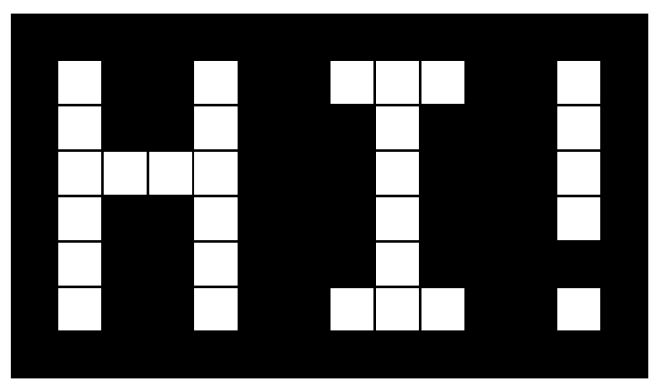
FIG. 4E is a schematic diagram of another displayed pattern of a display panel provided by a first embodiment.

For example, in practical applications, images with white character on black background or black character on white background may be displayed by controlling of the display state (that is, the bright state and the dark state) of the display sub-pixel 102, for example, images with patterns illustrated in FIG. 4D and FIG. 4E are displayed by the display panel illustrated in FIG. 3B. For example, the above-mentioned display panels may be applied to display devices such as electronic books, but the embodiments of the present disclosure are not limited to the case.

For example, because the display panel provided by the embodiment of the present disclosure does not need to use a polarizer, the power consumption of the above-mentioned display panel can be decreased. For example, because the structure of the display panel provided by the embodiment of the present disclosure is simple, the manufacturing processes can be simplified, and detect-free rate of the display panel can be increased.

For example, according to practical demands, the display panel provided by the embodiment of the present disclosure further comprises a barrier, such that agglomeration of the charged particle can be suppressed. For example, illustrative descriptions will be given to the arrangement of the barrier with reference to FIG. 1, FIG. 2 and FIG. 3A in the following.

For example, as illustrated in FIG. 2, the barrier 1021*a* is disposed between two adjacent first electrodes 1022; for another example, as illustrated in FIG. 3A, the barrier 1021*a* is disposed between two adjacent second electrodes 1023. For example, as illustrated in FIG. 2 and FIG. 3A, a length of the barrier 1021*a* in a direction perpendicular to the first transparent electrode layer 1022*a* is equal to a distance between the first transparent electrode layer 1022*a* and the second transparent electrode layer 1023*a* in the direction perpendicular to the first transparent electrode layer 1022*a*. For example, as illustrated in FIG. 1, enclosed cavities arranged in array are defined by the barrier 1021*a*, and the first transparent electrode layer 1022*a* and the second transparent electrode layer 1023*a*. For example, each enclosed cavity corresponds to one display sub-pixel 102, the plurality of charged particles 1021*b* disposed in the dielectric layer 1021 of each the display sub-pixel 102 can be separated from the plurality of charged particles 1021*b* disposed in the dielectric layer 1021 of adjacent display sub-pixels 102 by the barrier 1021*a*, such that the number of the charged particles 1021*b* disposed in each the display sub-pixel 102 can be fixed and agglomeration of the charged particle 1021*b* in a specific display sub-pixel 102 can be suppressed, and thus the display quality of the display panel can be increased.

For example, the dielectric layer 1021 in any two adjacent display sub-pixels 102 is separated by the barrier 1021*a*, such that agglomeration of the charged particle 1021*b* in the dielectric layer 1021 can be effectively suppressed. For example, the barrier 1021*a* is opaque (that is, no light is allowed to transmit through the barrier, or can block light incident on it), and the opaque barrier 1021*a* is, for example, made from resin material, color of the resin material is for example black. For example, light leaked from adjacent display sub-pixels can be prevented by using the barrier 1021*a* made from opaque resin material, for example, in a case that one of the display sub-pixels is in the bright state, the scattering light of the display sub-pixel may affect the adjacent display sub-pixels and thus light leakage may occur.

For example, in a case that the first charged particle 1021*b* is a spherical shape charged particle and the display sub-pixel 102 is in the bright state, a gap between the spherical shape charged particle and the inner surface of the second electrodes 1023 is filled with the dielectric layer 1021, and thus part of incident light λ can be totally reflected. For example, for better use of the incident light λ, the inner surface of the second electrodes 1023 is covered with the charged particles as many as possible, such that the ratio of the totally reflected light to the incident light λ, can be decreased, and thus the light transmittance of the display sub-pixel 102 and the display brightness of the display sub-pixel 102 in the bright state can be increased.

For example, in order to allow the inner surface of the second electrodes 1023 to be covered with the charged particles as many as possible, charged particles with various shapes and sizes are adopted. For example, the charged particles further comprises a second charged particle, and a size of the second charged particle is smaller than a size of the first charged particle 1021*b*, such that the gap between the first charged particle 1021*b* and the inner surface of the second electrodes 1023 can be filled with the second charged particles. For example, as illustrated in FIG. 4C, the second the charged particles are cone-shape charged particle (i.e., the black triangle in FIG. 4C), but the embodiments of the present disclosure are not limited to the case; for another example, the second the charged particles are spherical shape charged particle or ellipsoid shape charged particle.

For example, as illustrated in FIG. 4C, the incident light λ incident on the second charged particle (for example, cone-shape charged particle) is incident on the first charged particle, then enters into the dielectric layer 1021 by scattering of the first charged particle, and exits through the first electrodes 1022 of the display sub-pixel 102, therefore, the display brightness of the display sub-pixel 102 in the bright state can be increased.

For example, a ratio of the quantity of electric charge and the mass of the second charged particle may be larger than a ratio of the quantity of electric charge and the mass of the first charged particle 1021b; in such a case, the second charged particle can move to the inner surface of the second electrodes 1023 at faster speed (compare with the speed of the first charged particle 1021b) when the first voltage is applied on the display pixels, such that the inner surface of the second electrodes 1023 can be covered with the second charged particles more effectively, and the ratio of the totally reflected light to the incident light λ can be effectively decreased when the display sub-pixel 102 is in the bright state, such that the display brightness of the display sub-pixel 102 in the bright state can be further increased.

For example, the display panel 10 can realize colorful display through combining various colors of display sub-pixels 102, and descriptions will be given by the embodiment of the present disclosure with the following two display sub-pixels 102 taken as examples.

Figure 5A:
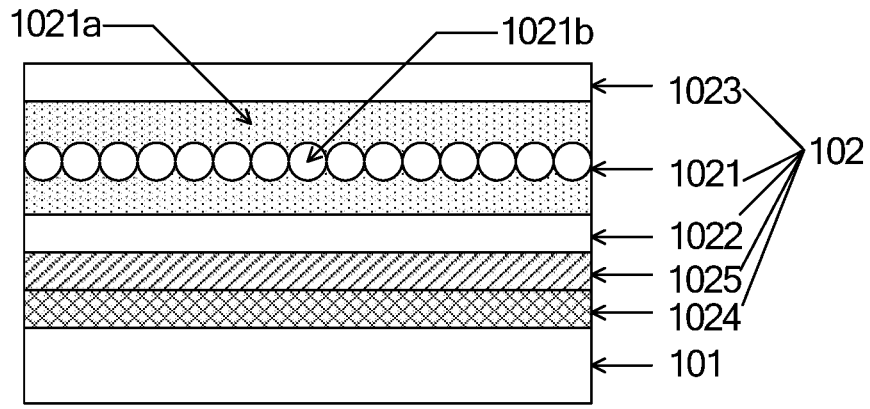
FIG. 5A is a schematically structural view of further another display panel provided by a first embodiment.
Figure 5B:
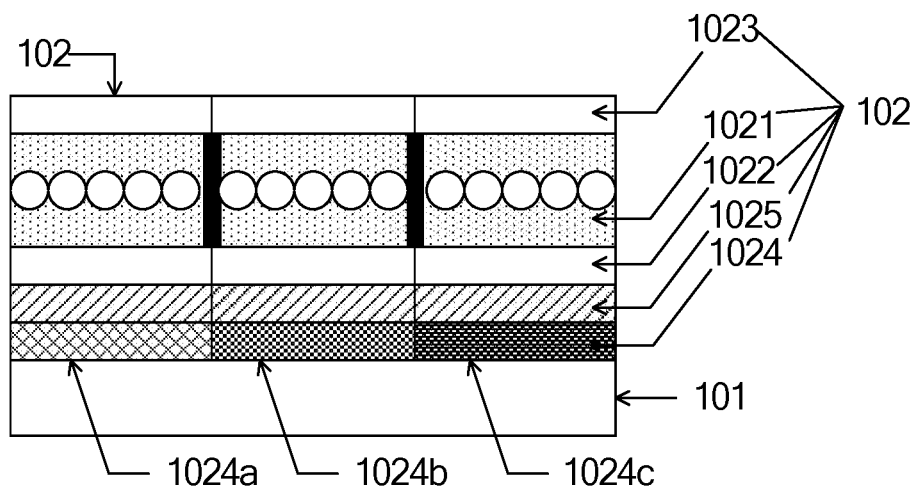
FIG. 5B is another schematically structural view of further another display panel provided by a first embodiment.

Illustrative descriptions will be given to the first display sub-pixel 102 with reference to FIG. 5A and FIG. 5B. As illustrated in FIG. 5A and FIG. 5B, the display panel 10 further comprises a color resist layer 1024, the color resist layer 1024 may be disposed, for example, at a side of the first transparent electrode layer 1022a distal to the second transparent electrode layer 1023a and the color resist layer 1024 comprises at least one color of color filter.

For example, according to practical demands, the display panel 10 further comprises a planarization layer 1025, and the planarization layer 1025 for example is disposed between the color resist layer 1024 and the first transparent electrode layer 1022a.

For example, one display sub-pixel 102 illustrated in FIG. 5A is taken as an example, the display sub-pixel 102 comprises the color resist layer 1024 and the planarization layer 1025, the color resist layer 1024 comprises a color filter of one color, the color resist layer 1024 and the planarization layer 1025 are sequentially disposed between the base substrate 101 and the first electrodes 1022 along a direction perpendicular to the base substrate 101. Structures of other display sub-pixels of the display panel can refer to the display sub-pixel 102 illustrated in FIG. 5A, no further descriptions will be given herein.

It should be understood that the display panel comprises a plurality of display sub-pixel groups (that is, display pixels) arranged in an array, for example, the plurality of display sub-pixel groups are arranged respectively along a row direction and a column direction sequentially, each display sub-pixel group comprises at least two display sub-pixels 102, the color filters of the at least two display sub-pixels 102 have different colors. For example, as illustrated in FIG. 5B, each display sub-pixel group comprises three display sub-pixels 102; the color resist layers 1024 in the three display sub-pixels 102 respectively comprises a red color filter 1024a, a green color filter 1024b and a blue color filter 1024c, but the embodiments of the present disclosure are not limited to the case. In a case that the structure illustrated in FIG. 5B is adopted, each display sub-pixel group can emit colorful light with red, green and blue taken as primary colors, and colorful patterns can be effectively displayed by the display panel with the plurality of display sub-pixel groups arranged in array.

For example, in practical applications, the display sub-pixel 102 comprises the planarization layer 1025. Alternatively, the display sub-pixel 102 does not comprise the planarization layer 1025. The planarization layer 1025 is provided in the display sub-pixel 102, in order to avoid a defect in the first electrode 1022 or a process difficulty due to the unevenness of the color resist layer 1024 while the first electrode 1022 is formed by a single patterning process on the base substrate 101 with the color resist layer 1024 formed thereon.

For example, according to practical demands, the color resist layer 1024 may be disposed at a side of the second transparent electrode layer 1023 distal to the first transparent electrode layer 1022, in such a case, it's not necessary to provide the planarization layer. For example, concrete structures and arrangement of the color resist layer 1024 disposed at the side of the second transparent electrode layer 1023 distal to the first transparent electrode layer 1022 can refer to embodiments illustrated in FIG. 5A and FIG. 5B, no further descriptions will be given herein.

Figure 5C:
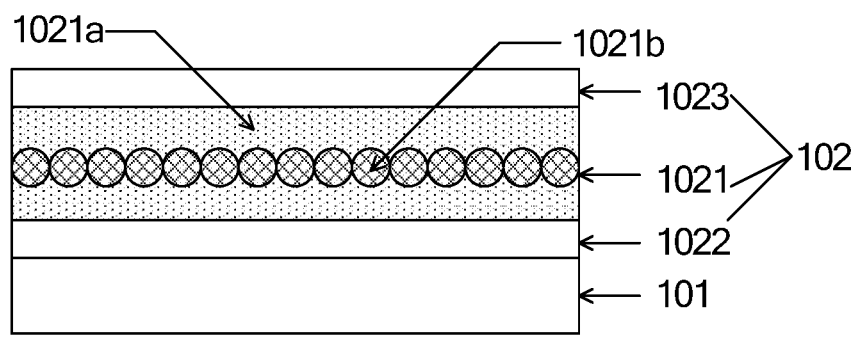
FIG. 5C is a schematically structural view of still another display panel provided by a first embodiment.
Figure 5D:
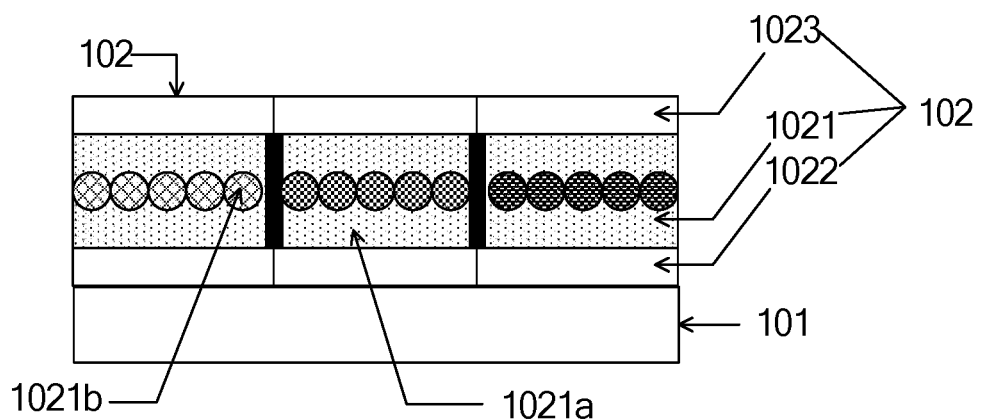
FIG. 5D is another schematically structural view of still another display panel provided by a first embodiment.

Illustrative descriptions will be given to the second display sub-pixel 102 with reference to FIG. 5C and FIG. 5D. As illustrated in FIG. 5C, a display sub-pixel 102 illustrated in FIG. 5C is taken as an example, the display sub-pixel 102 comprises one color of charged particles, the charged particles are for example red charged particles (absorbing green light and blue light and scattering red light), green charged particles (absorbing red light and blue light and scattering green light) or blue charged particles (absorbing green light and red light and scattering blue light). For example, structures of other display sub-pixels of the display panel can refer to the display sub-pixel 102 illustrated in FIG. 5C, no further descriptions will be given herein.

It should be understood that the display panel comprises a plurality of display sub-pixel groups (that is, display pixels) arranged in array, for example, the plurality of display sub-pixel groups are arranged respectively along a row direction and a column direction sequentially, each display sub-pixel group comprises at least two display sub-pixels 102, the charged particles of the at least two display sub-pixels 102 have different colors. For example, as illustrated in FIG. 5D, each display sub-pixel group comprises three display sub-pixels 102, colors of the charged particles of the three display sub-pixel 102 are red, green and blue respectively, but the embodiments of the present disclosure are not limited to the case. In a case that the structure illustrated in FIG. 5D is adopted, each display sub-pixel group can emit colorful light with red, green and blue taken as primary colors, and colorful patterns can be effectively displayed by the display panel with the plurality of display sub-pixel groups arranged in array.

For example, in practical applications, colorful images can be displayed by controlling of the display state of the display sub-pixel 102. For example, the images illustrated in FIG. 4D and FIG. 4E can be displayed by the display panel illustrated in FIG. 3B in a colorful form. For example, the display panel provided by the embodiment of the present disclosure can be applied to display devices such as cell-phone and TV, such that a desired visual effect can be realized, but the embodiments of the present disclosure are not limited to the case.

For example, in the present embodiment the display panel does not use a polarizer; in addition, it is not necessary to refresh the displayed images in real time (i.e., refreshing of the displayed images may be only performed when the displayed image needs to be refreshed); therefore, power consumption of the display panel can be decreased. Because the structure of the display panel provided by the embodiment of the present disclosure is simple, the manufacturing processes can be simplified, and thus defect-free rate of the display panel can be increased. For another example, agglomeration of the charged particle can be effectively suppressed, and thus the display quality of the display panel can be increased through providing the barrier. For further another example, the colorful display of the display panel 10 can be realized through providing the color resist layer or through adopting charged particles of various colors.

Second Embodiment

The present embodiment provides a display device, the display device comprises the display panel provided by the first embodiment, and the display panel may be any of the display panels illustrated in FIG. 1 to FIG. 3A and FIG. 5B to FIG. 5D.

Figure 6:
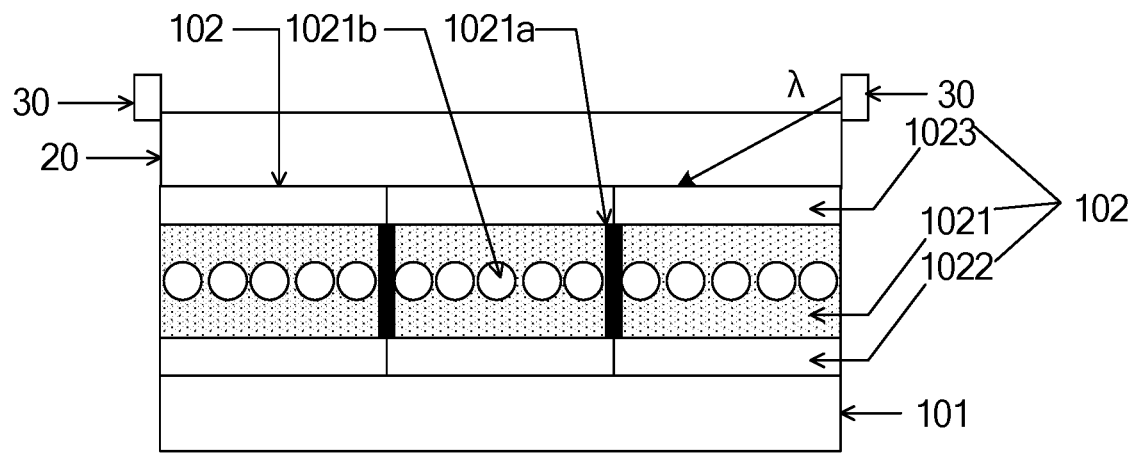
FIG. 6 is an illustrative schematic diagram to illustrate working principle and structure of a display device provided by a second embodiment.

For example, as illustrated in FIG. 6, the display device further comprises a light source 30. For example, the light source 30 is configured to emit light, such that the light (emitted by the light source 30) incident on the light-incident side of the display panel satisfies total reflection condition of an incident interface, and the incident interface is an interface between the second transparent electrode layer 1023a and the dielectric layer 1021. For example, the light source 30 is a collimation light source, and an incident angle of the collimation light at the incident interface is larger than a critical angle of total reflection of the incident interface. For another example, in a case that the total reflection condition of the incident interface is satisfied, the light source 30 also may be a light source with certain divergence angle. The light source 30 comprises for example a light-emitting diode (LED) and the like.

For example, light emitted by the light source 30 is directly incident on the light-incident side of the display panel. For example, in a case that the light source 30 is a collimation light source, a beam expanding system can be adopted to increase the diameter of the collimated light outputted by the light source 30, such that the entire light-incident side of the display panel can be covered by the light outputted by the light source 30. For another example, the light outputted by the light source 30 may be also incident on the light-incident side of the display panel via a light guide plate 20. For example, the light guide plate is disposed at the light-incident side of the display panel, and configured to couple light emitted by the light source 30 into the display panel. For example, according to practical demands, the light source 30 is provided at one side or both sides of the light guide plate 20.

It should be understood that the light guide plate 20 may be made from a transparent material with refractive index larger than that of the dielectric layer 1021, and the refractive index of the light guide plate 20 is, for example, equal to or similar to the refractive indices of the charged particles and the second electrodes 1023. For example, the material of fabricating the light guide plate 20 may be quartz glass (with refractive index of approximately 1.5), resin glass (with refractive index of approximately 1.74), polycarbonate plastic (with refractive index of approximately 1.58), polystyrene (with refractive index of approximately 1.46), or the like.

For example, air is provided at a side of the light guide plate 20 distal to the display panel, because the refractive index of the air is not greater than the dielectric layer 1021, light propagating in the light guide plate 20 satisfies total reflection condition of an interface between the light guide plate 20 and the air. For example, in a case that the display panel is in the dark state, the light propagating in the light guide plate 20 also satisfy total reflection condition of an interface between the light guide plate 20 and the dielectric layer 1021; in such a case, the light propagating in the light guide plate 20 cannot be coupled into the display panel. For example, in a case that the display panel is in the bright state, the charged particle moves to an inner surface of the second electrode layer 1023a, because the refractive index of the charged particle is equal to or greater than that of the second electrode layer 1023a, the light propagating in the light guide plate 20 can be coupled into the display panel.

For example, the display device provided by the embodiment of the present disclosure can be any products or device that has display function, such as an electronic paper, a cell phone, a tablet computer, a television, a display screen, a laptop, a digital photo frame or a navigator.

For example, in the present embodiment, power consumption of the display panel can be decreased because the display device does not need a polarizer, the manufacturing processes can be simplified and the defect-free rate oldie display panel can be increased because the structure of the display panel provided by the embodiment of the present disclosure is simple.

Third Embodiment

For example, the present embodiment provides a method of controlling brightness. For example, the method of controlling brightness comprises the following steps.

Step S110: applying a first voltage, such that charged particles are distributed at a side of a second medium proximal to a first medium, and at least part of an incident light enters into the second medium from the first medium by scattering of the charged particles and exits through the second medium.

Step S120: applying a second voltage, such that the charged particles are distributed at a side of the second medium distal to the first medium, and the incident light is totally reflected back into the first medium at an interface between the first medium and the second medium, the incident light is incapable of exiting through the second medium.

For example, the incident light is transmitted from the first medium to the second medium. For example, in a case of observing at a side of the second medium distal to the first medium, a bright state can be realized through applying the first voltage, and a dark state can be realized through applying the second voltage. For example, the method of controlling the brightness of the display panel provided by the first embodiment is taken as an example, the first medium and the second medium are respectively the second transparent electrode layer and the dielectric layer, but the embodiments of the present disclosure are not limited to the case. For example, the concrete contents of the method of controlling brightness provided by the present embodiment can refer to the method of controlling the brightness of the display panel provided by the first embodiment; no further descriptions will be given herein. For example, the method of controlling brightness can realize the control of the bright state and the dark state.

Fourth Embodiment

The present embodiment provides a manufacturing method of a display panel, the manufacturing method of the display panel comprises the following steps.

Step S210: forming a first transparent electrode layer as a light-exiting side of the display panel;

Step S220: forming a second transparent electrode layer as a light-incident side of the display panel; and Step S230: filling a gap between the first transparent electrode layer and the second transparent electrode layer with a dielectric layer, a plurality of charged particles being disposed in the dielectric layer.

For example, refractive index of the second transparent electrode layer is larger than refractive index of the dielectric layer, and refractive index of the charged particles is equal to or greater than the refractive index of the second transparent electrode layer.

For example, the manufacturing method of the display panel is not limited to sequentially executing the step S210, the step S220 and the step S230. For example, according to practical demands, the manufacturing method can also be performed by sequentially executing the step S210, the step S230 and the step S220, or by sequentially executing the step S220, the step S210 and the step S230, no concrete limitation will be given herein.

For example, illustrative descriptions will be given to the manufacturing method provided by the present embodiment by taking the display panel in FIG. 2 as an example, but the manufacturing method provided by the present embodiment is not limited to fabricate the display panel in FIG. 2.

Figure 7A:
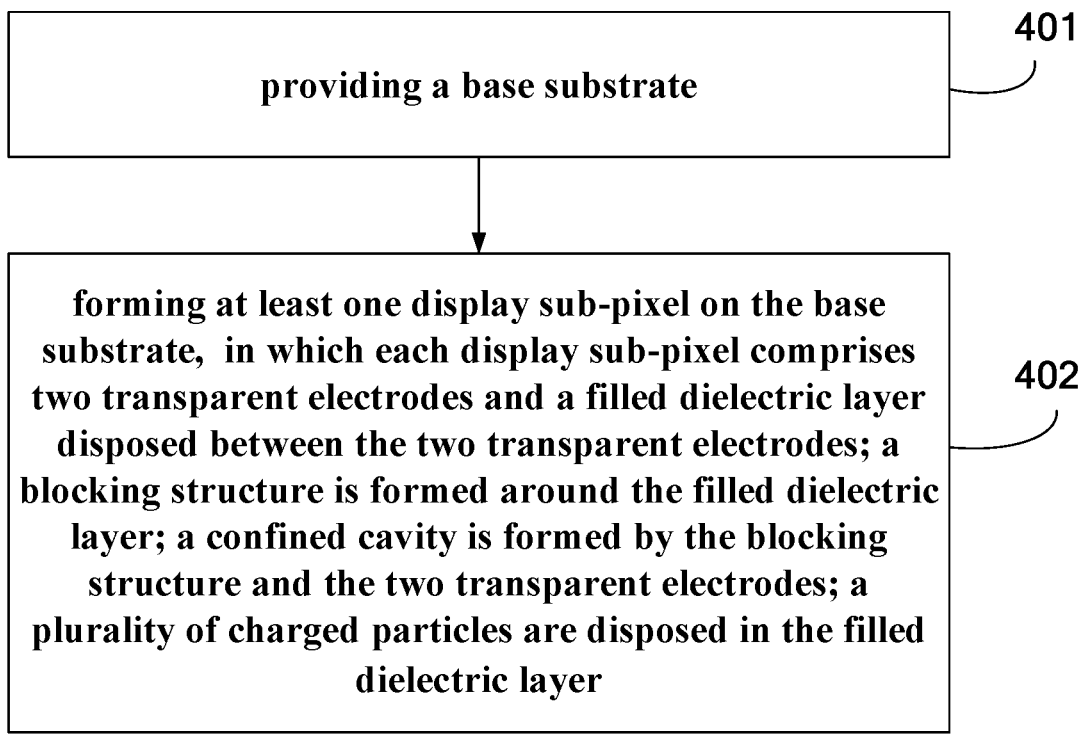
FIG. 7A is an illustrative flow chart of a manufacturing method for a display panel provided by a fourth embodiment.

For example, as illustrated in FIG. 7A, the manufacturing method of the display panel comprises the following steps.

Step 401: providing a base substrate.

For example, the material for fabricating the base substrate is transparent material, such as glass, quartz, plastic, or the like. As an example, the base substrate is made from glass.

Step 402: forming at least one display sub-pixel on the base substrate, each display sub-pixel comprises two transparent electrodes (i.e., a first electrode and a second electrode), and a dielectric layer disposed between the two transparent electrodes; a barrier is formed around the dielectric layer; an enclosed cavity is encircled by the barrier and the two transparent electrodes; a plurality of charged particles are disposed in the dielectric layer; the barrier may be formed by using the method such as photolithography, imprint, or the like.

For example, the embodiment of the present disclosure can change positions of the plurality of charged particles in the dielectric layer of the display sub-pixel by applying voltages on the first electrode and/or the second electrode, and thus can realize two display states (i.e., the bright state and the dark state) of the display sub-pixel. For example, control methods for realizing the bright state and the dark state of the display sub-pixel can refer to the display panel provided by the first embodiment, no further descriptions will be given herein.

For example, according to practical demands, the charged particles comprise first charged particles only, or comprise combination of the first charged particles and second charged particles.

For example, concrete arrangement of the first charged particles and the second charged particles can refer to the display panel provided by the first embodiment, no further descriptions will be given herein.

For example, charged types (i.e., positively charged or negatively charged) of the charged particles and methods for controlling of voltages applied on the first electrode and/or the second electrode can refer to the display panel provided by the first embodiment, no further descriptions will be given herein.

For example, the display panel formed by the manufacturing method of the display panel illustrated in FIG. 7A can realize monochrome display. For example, according to practical demands, the manufacturing method of the display panel provided by the present embodiment also can be used to fabricate a display panel capable of realizing colorful display.

For example, in the following, illustrative descriptions will be given to the manufacturing method of the display panel illustrated in FIG. 5A and FIG. 5B with reference to FIG. 7B; however, the manufacturing method provided by the present embodiment is not limited to fabricate the display panel illustrated in FIG. 5A and FIG. 5B.

Figure 7B:
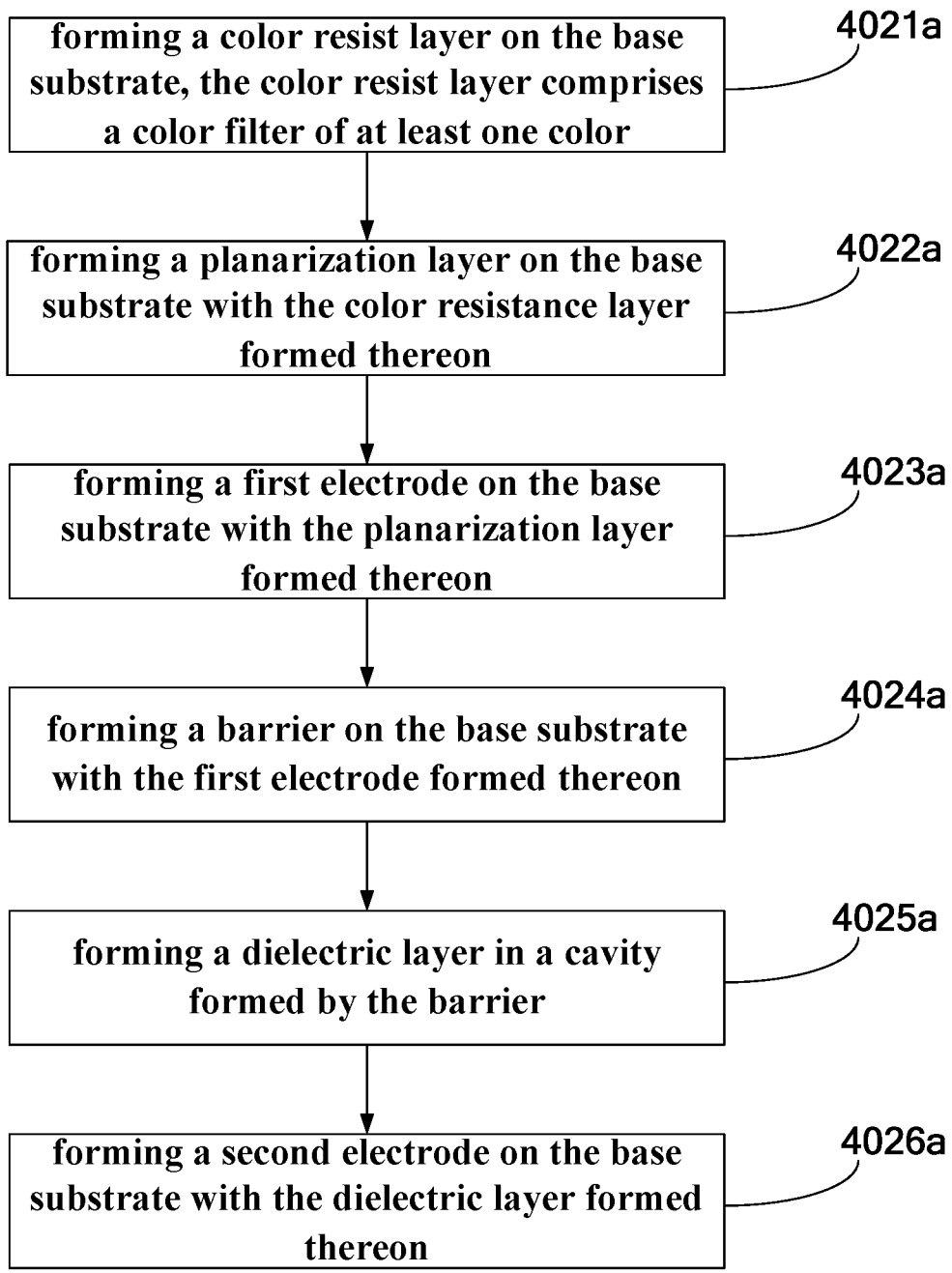
FIG. 7B is another illustrative flow chart of a manufacturing method for a display panel provided by a fourth embodiment.

For example, as illustrated in FIG. 7B the manufacturing method of the display panel comprises the following step 4021a to step 4026a.

Step 4021a: forming a color resist layer on the base substrate, the color resist layer comprises a color filter of at least one color.

It should be understood that the display panel comprises a plurality of display sub-pixel groups arranged in array, for example, the plurality of display sub-pixel groups are arranged respectively along a row direction and a column direction sequentially, each display sub-pixel group comprises at least two display sub-pixels, the color filters of the at least two display sub-pixels 102 have different colors. For example, as illustrated in FIG. 5B, each display sub-pixel group comprises three display sub-pixels 102, the color resist layers 1024 in the three display sub-pixels 102 respectively comprises a red color filter 1024a, a green color filter 1024b and a blue color filter 1024c. In a case that the structure illustrated in FIG. 5B is adopted, each display sub-pixel group can emit colorful light with red, green and blue taken as primary colors, and colorful patterns can be effectively displayed by the display panel with a plurality of display sub-pixel groups arranged in array.

Step 4022a: forming a planarization layer on the base substrate with the color resist layer formed thereon.

As an example, in practical applications, the display sub-pixel comprises the planarization layer, or does not comprise the planarization layer. The planarization layer is provided in the display sub-pixel, in order to avoid a defect in the first electrode or a process difficulty due to the unevenness of the color resist layer while the first electrode is formed by a single patterning process on the base substrate 101 with the color resist layer formed thereon.

Step 4023a: forming a first electrode on the base substrate with the planarization layer formed thereon.

As an example, the first electrode is made from metallic oxide such as indium tin oxide (ITO), or indium zinc oxide (IZO).

Step 4024a: forming a barrier on the base substrate with the first electrode formed thereon.

It should be understood that the dielectric layers in any two adjacent display sub-pixels can be separated by the barrier, such that agglomeration of the charged particles in the dielectric layer can be effectively suppressed. As an example, the barrier is made from opaque resin material; in a case that one of the display sub-pixels is in the bright state, the barrier made from opaque resin material can avoid the light leakage caused by the scattering light of the display sub-pixels.

Step 4025*a*: forming a dielectric layer in a cavity formed by the barrier.

It should be understood that a plurality of charged particles are disposed in the dielectric layer. The dielectric layer may be air or transparent ink. For example, refractive index of air is approximately 1; for example, refractive index of the transparent ink is approximately 1.3. As an example, the charged particles may be transparent particles, refractive index of the charged particles is equal to or similar to the refractive index of the second electrodes; For example, the refractive index of the charged particles is larger than or equal to the refractive index of the second transparent electrode layer.

Step 4026*a*: forming a second electrode (for example, on the base substrate with the dielectric layer formed thereon).

For example, the manufacturing method of the display panel illustrated in FIG. 7B is not limited to sequentially executing the step 4021*a*, the step 4022*a*, the step 4023*a*, the step 4024*a*, the step 4025*a* and the step 4026*a*. For example, according to practical demands, the manufacturing method of the display panel illustrated in FIG. 7B can also be performed through sequentially executing the step 4026*a*, the step 4021*a*, the step 4022*a*, the step 4023*a*, the step 4024*a*, and the step 4025*a*, in such a case, the second electrode may be directly formed on a light guide plate of the display device; correspondingly, the barrier may be formed on the second electrode.

For example, in the following, illustrative descriptions will be given to the manufacturing method of the display panel illustrated in FIG. 5C and FIG. 5D with reference to FIG. 7C; however, the manufacturing method provided by the present embodiment is not limited to fabricate the display panel illustrated in FIG. 5C and FIG. 5D.

Figure 7C:
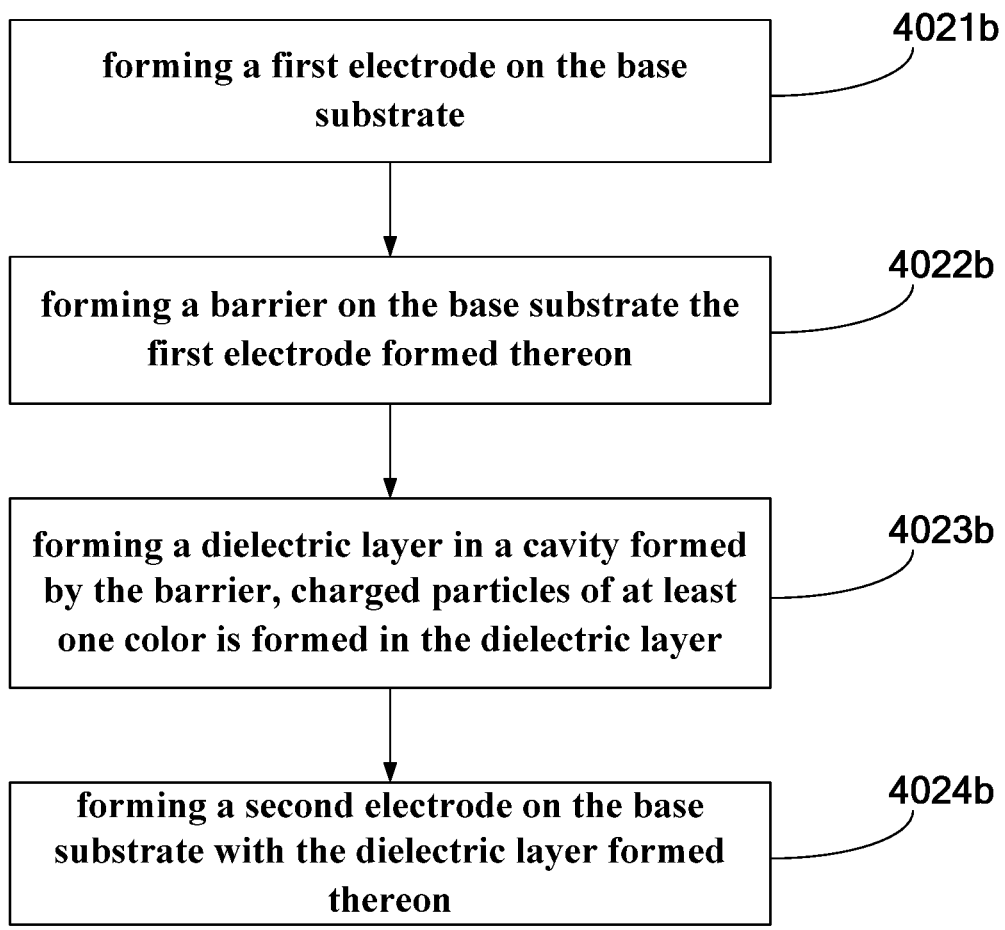
FIG. 7C is further another illustrative flow chart of a manufacturing method for a display panel provided by a fourth embodiment.

For example, as illustrated in FIG. 7C, the manufacturing method of the display panel comprises the following step 4021*b*-step 4024*b*.

Step 4021*b*: forming a first electrode on the base substrate.

The present step may refer to the above-mentioned step 4023*a*; no further descriptions will be given herein.

Step 4022*b*: forming a barrier on the base substrate with the first electrode formed thereon.

The present step may refer to the above-mentioned step 4024*a*; no further descriptions will be given herein.

Step 4023*b*: forming a dielectric layer in a cavity formed by the barrier, charged particles of at least one color are disposed in the dielectric layer.

It should be understood that the display panel comprises a plurality of display sub-pixel groups (that is, display pixels) arranged in array, for example, the plurality of display sub-pixel groups are arranged respectively along a row direction and a column direction sequentially, each display sub-pixel group comprises at least two display sub-pixels, colors of the charged particles of the at least two display sub-pixels are different from each other. For example, as illustrated in FIG. 5D, each display sub-pixel group comprises three display sub-pixels 102; colors of the charged particles of the three display sub-pixel 102 respectively may be red, green and blue. In a case that the structure illustrated in FIG. 5D is adopted, each display sub-pixel group can emit colorful light with red, green and blue taken as primary colors, and colorful patterns can be effectively displayed by the display panel with a plurality of display sub-pixel groups arranged in array.

Step 4024*b*: forming a second electrode on the base substrate formed with the dielectric layer.

The present step may refer to the above-mentioned step 4026*a*; no further descriptions will be given herein.

It should be understood that same layer level of the plurality of display sub-pixels may be formed by same and one process (for example, a patterning process) during fabricating the display panel. For example, the first electrodes of the plurality of display sub-pixels are formed on the base substrate by same and one process, the barriers of the plurality of display sub-pixels may be formed by same and one patterning process, the dielectric layers of the plurality of display sub-pixels may be formed in cavities formed by the barriers through a filling process, and then the second electrodes of the plurality of display sub-pixels may be formed on the dielectric layers by another same and one process (for example, a patterning process).

It should be understood that the order of the steps of the manufacturing method of the display panel may be adjusted appropriately; steps can be added or subtracted according to specific implementations, methods which can be easily envisaged by those skilled in the art based on the technical solutions disclosed by the present disclosure should fall within the scope of the present disclosure, and thus no further descriptions will be given herein.

Those skilled in the art should understand that, for the sake of clarity, detailed descriptions of the concrete working processes of the manufacturing method for the display panel may be refer to corresponding processes of the device embodiment described earlier, no further descriptions will be given herein.

For example, complexity of the manufacturing method for the display panel provided by the present embodiment is low, and thus the defect-free rate of the display panel can be increased.

The above descriptions are only preferable embodiments, and are not intended to limit the present disclosure; ally modifications, substitutions, improvements, and the like without departing from the spirit and the principle of the present disclosure should fall within the scope of the present disclosure.

What are described above is related to the illustrative embodiments of the disclosure only and not limitative to the scope of the disclosure; the scopes of the disclosure are defined by the accompanying claims.

The application claims priority to the Chinese patent application No. 201610868495.9, filed on Sep. 29, 2016, the entire disclosure of which is incorporated herein by reference as part of the present application.

What is claimed is:

1. A display panel, comprising:
   a first transparent electrode layer disposed at a light-exiting side of the display panel;
   a second transparent electrode layer disposed at a light-incident side of the display panel;
   a dielectric layer disposed between the first transparent electrode layer and the second transparent electrode layer; and
   a plurality of charged particles disposed in the dielectric layer and comprising:
   first charged particles, the first charged particles being configured to have a first state and a second state, wherein the first charged particles in the first state are configured to move to an inner surface of the second transparent electrode layer, such that the display panel is in bright state, and the first charged particles in the second state are configured to move to an inner surface of the first transparent electrode layer, such that the display panel is in dark state;

second charged particles filled in gaps between the first charged particles in the first state and the inner surface of the second transparent electrode layer, the second charged particles being configured to direct an incident light to the first charged particles in the first state, and the first charged particles in the first state are further configured to scatter the incident light into the dielectric layer and exit through the first transparent electrode;

wherein a refractive index of the second transparent electrode layer is greater than a refractive index of the dielectric layer, such that the incident light entering into the dielectric layer from the second transparent electrode layer is totally reflected back into the second transparent electrode layer at an interface between the second transparent electrode layer and the dielectric layer, and the display panel is in the dark state, and wherein a size of each second charged particle is smaller than a size of each first charged particle.

2. The display panel according to claim 1, wherein a refractive index of the charged particles is equal to or greater than the refractive index of the second transparent electrode layer.

3. The display panel according to claim 1, wherein the first charged particles are spherical shape particles.

4. The display panel according to claim 1, wherein a ratio of a charge quantity of the second charged particle and a mass of the second charged particle is larger than that of the first charged particle.

5. The display panel according to claim 1, wherein the charged particles are transparent particles.

6. The display panel according to claim 1, wherein the first transparent electrode layer comprises first electrodes, which are arranged in an array and electrically insulated from each other, and/or
the second transparent electrode layer comprises second electrodes, which are arranged in an array and electrically insulated from each other.

7. The display panel according to claim 6, further comprising: a barrier, wherein
the barrier is disposed between two adjacent first electrodes and/or disposed between two adjacent second electrodes; and
enclosed cavities are formed by the barrier, the first transparent electrode layer and the second transparent electrode layer and are arranged in an array.

8. The display panel according to claim 7, wherein the barrier is of light-blocking.

9. The display panel according to claim 7, wherein the display panel comprises display pixels arranged in an array, each display pixel comprises at least two display sub-pixels, each display sub-pixel corresponds to one of enclosed cavities, colors of the charged particles in the at least two display sub-pixels are different from each other.

10. The display panel according to claim 1, further comprising: a color resist layer, wherein the color resist layer is disposed at a side of the first transparent electrode layer distal to the second transparent electrode layer, and comprises a color filter of at least one color.

11. The display panel according to claim 10, further comprising: a planarization layer, wherein the planarization layer is disposed between the color resist layer and the first transparent electrode layer.

12. A display device comprising the display panel according to claim 1.

13. The display device according to claim 12, further comprising: a light source, wherein
the light source is configured to allow light to be incident on the light-incident side of the display panel to satisfy total reflection condition of an incident interface; and
the incident interface is an interface between the second transparent electrode layer and the dielectric layer.

14. The display device according to claim 13, further comprising: a light guide plate, wherein the light guide plate is provided at the light-incident side of the display panel, and is configured to guide light emitted by the light source into the display panel.

15. The display device according to claim 13, wherein the light source is a collimation light source; and an incident angle of the collimation light source at the incident interface is larger than a critical angle of total reflection of the incident interface.

16. A method of controlling brightness of the display panel according to claim 1, comprising:
applying a first voltage, such that the first charged particles are distributed at a side of a second medium proximal to a first medium, and at least part of an incident light enters into the second medium from the first medium by scattering of the charged particles and exits through the second medium, and the display panel is in the bright state; and
applying a second voltage, such that the charged particles are distributed at a side of the second medium distal to the first medium, and the incident light is totally reflected back into the first medium at an interface between the first medium and the second medium, the incident light is incapable of exiting through the second medium, and the display panel is in the dark state;
wherein the incident light propagates from the first medium to the second medium.

17. A method of manufacturing a display panel, comprising:
forming a first transparent electrode layer as a light-exiting side of the display panel;
forming a second transparent electrode layer as a light-incident side of the display panel; and
filling a gap between the first transparent electrode layer and the second transparent electrode layer with a dielectric layer;
wherein a plurality of charged particles are disposed in the dielectric layer, and the plurality of charged particles comprises:
first charged particles, the first charged particles being configured to have a first state and a second state, wherein the first charged particles in the first state are configured to move to an inner surface of the second transparent electrode layer, such that the display panel is in bright state, and the first charged particles in the second state are configured to move to an inner surface of the first transparent electrode layer, such that the display panel is in dark state; and
second charged particles, filled in gaps between the first charged particles and the inner surface of the second transparent electrode layer, the second charged particles being configured to direct an incident light to the first charged particles in the first state, and the first charged particles in the first state are further configured to scatter the incident light into the dielectric layer and exit through the first transparent electrode wherein a refractive index of the second transparent electrode layer is larger than a refractive index of the dielectric layer, such that the incident light entering into the dielectric layer from the second transparent electrode layer is totally reflected back into the second transparent electrode layer at an interface between the second transparent electrode layer and the dielectric layer, and the display panel is in the dark state, and wherein a size of each second charged particle is smaller than a size of each first charged particle.

18. The method according to claim 17, wherein a refractive index of the charged particles is equal to or greater than the refractive index of the second transparent electrode layer.

* * * * *